(No Model.) 2 Sheets—Sheet 1.

W. L. GATES.
CIRCUIT CONNECTOR FOR ELECTRIC SIGNALING APPARATUS.

No. 461,075. Patented Oct. 13, 1891.

(No Model.) 2 Sheets—Sheet 2.

W. L. GATES.
CIRCUIT CONNECTOR FOR ELECTRIC SIGNALING APPARATUS.

No. 461,075. Patented Oct. 13, 1891.

UNITED STATES PATENT OFFICE.

WALDO L. GATES, OF SPRINGFIELD, ASSIGNOR, BY DIRECT AND MESNE ASSIGNMENTS, TO FREDERICK A. WARREN, OF WILBRAHAM, AND FREDERICK W. BUFFINGTON, OF SPRINGFIELD, MASSACHUSETTS, AND THE ELECTRIC NOVELTY ADVERTISING COMPANY, OF NEW JERSEY.

CIRCUIT-CONNECTOR FOR ELECTRIC SIGNALING APPARATUS.

SPECIFICATION forming part of Letters Patent No. 461,075, dated October 13, 1891.

Application filed July 19, 1889. Renewed March 10, 1891. Serial No. 384,408. (No model.)

*To all whom it may concern:*

Be it known that I, WALDO L. GATES, a citizen of the United States, residing at Springfield, in the county of Hampden and State of Massachusetts, have invented new and useful Improvements in Circuit-Connectors for Electric Signaling Apparatus, of which the following is a specification.

This invention relates to electric signaling apparatus and to improved means for making connections in an electric circuit at random for the purpose of producing a variety of signals; and the invention consists in the peculiar construction and arrangement of the circuit-wires whereby those from the opposite poles of the battery are formed in groups in proximity to each other, combined with a roving or traveling circuit-connector capable of forming a connection between any two of said groups of said circuit-connections, all as hereinafter fully described, and more particularly pointed out in the claims.

Figure 1:
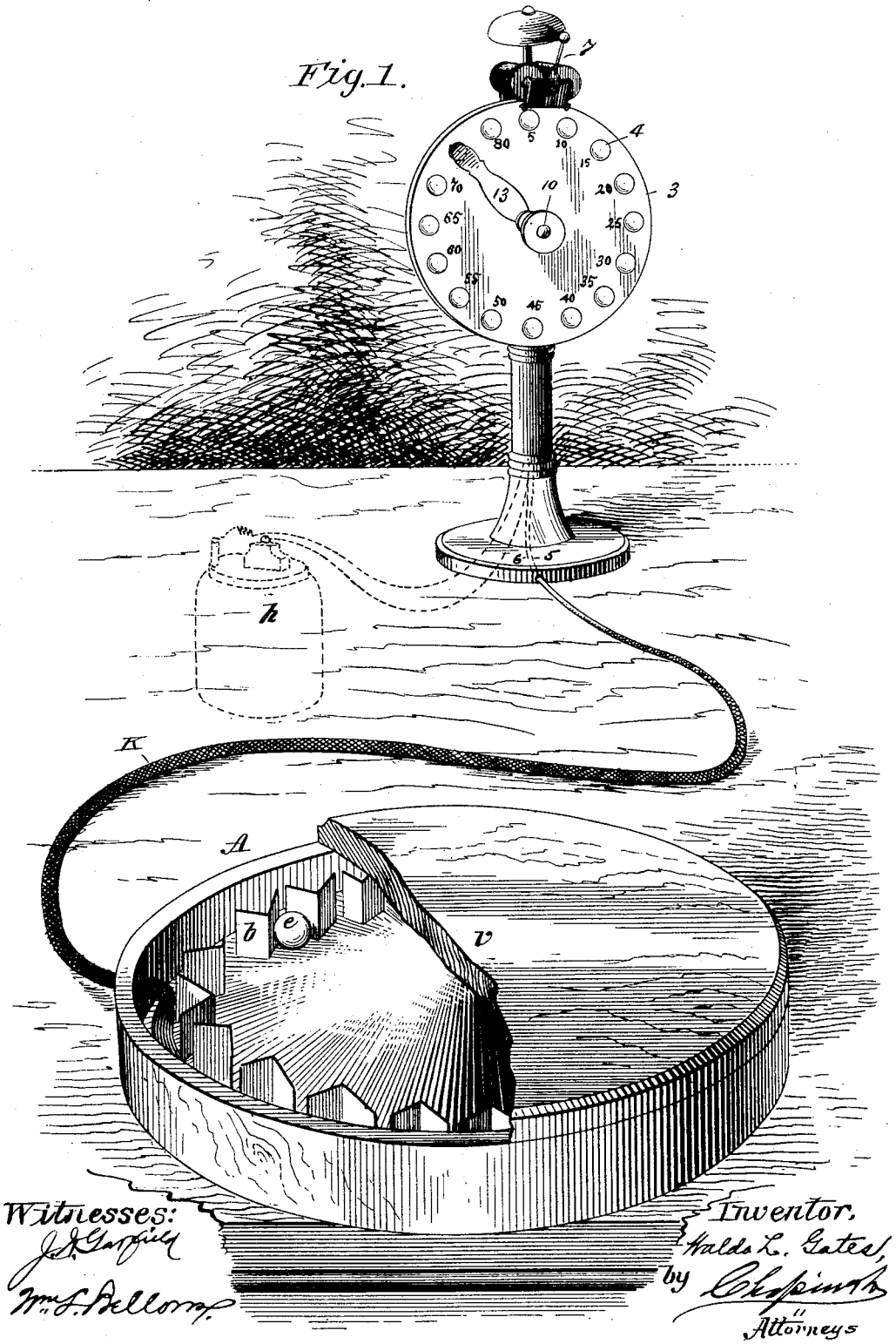
Figures 2, 3:
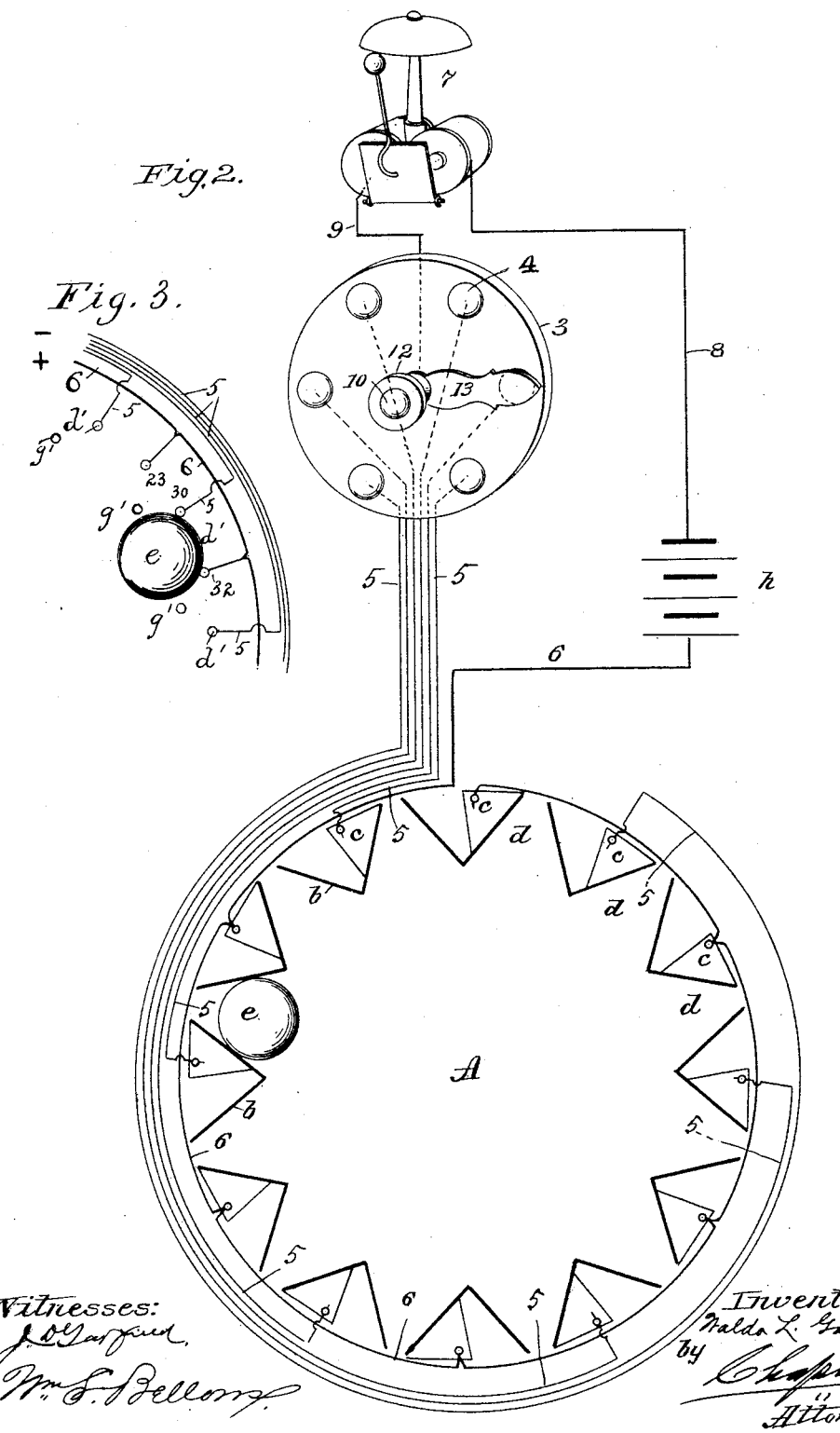

In the drawings forming part of this specification, Figure 1 is a perspective view of circuit-connecting devices constructed according to my invention, said devices being shown in electric connection with a signaling apparatus, whereby the operation of circuit-connecting devices may be made clear, said figure having indicated thereon in dotted lines a battery and connections between the same and said signaling apparatus. Fig. 2 is a diagram illustrating clearly the said circuit-connecting devices and the circuit-wires connecting the same with said signaling apparatus and a battery. Fig. 3 is a view of a slight modification in construction to be hereinafter referred to.

In the drawings, A indicates a box, shown in the drawings of circular form, that being the preferable one; but, if desired, said box may be of rectangular or other shape capable of containing the operative parts of the device, as below described. The said box A has secured within it, upon the bottom thereof and in proximity to its inner vertical wall, a series of electric connection plates or pieces $b$, said plates being so formed as to provide a lip $c$ (see Fig. 2) thereon, extending in the plane of the bottom of said box, said lips $c$ serving as a means for attaching said connection plates or pieces to the bottom of the box by means of screws or similar devices passing through them and as a convenient point on said plate with which to make electrical connections, as below described. If desired, metallic pins $d'$, as indicated in Fig. 3, may be driven into the bottom of said box to serve in place of said plates $b$ and the conducting-wires be suitably attached thereto. The said connection-plates $b$ stand vertically on the bottom of the box, as shown, and are of such form as contributes to produce between them, when so arranged, a series of openings to receive a movable unattached switch, as below described. In Fig. 1 the box-cover $v$, which in practice is secured thereon, is shown partly broken away. The box and cover are made of non-conducting material. The bottom of said box, on which the said connection-plates $b$ are arranged in a row around its border, is made preferably of convex form, as indicated by the shading in Fig. 1, to the end that from the center of the circle in which said connection-plates are arranged there may be such an incline downward toward said plates as will cause a spherical circuit connector or switch to roll from a position near the center of said box toward the borders thereof and lie by gravity between two of said connection plates or pieces, as shown in Figs. 1, 2, and 3. The said spherical switch-connector $e$ consists of a metallic ball, preferably of copper or any other good conductor. It is obvious, however, that the said ball $e$ may be made to roll toward either side of the box A and between the connection-plates there arranged by elevating the opposite edge of the box, even were the bottom thereof not made convex, as described; but it is more convenient to operate, and the said ball has a better contact with the plates $b$ when the bottom of the box is so made.

The signaling apparatus shown in the drawings for the purpose of illustrating how the improved circuit-connector may be operated in producing electric signals consists of a standard, upon which is fixed a circular head 3, in which are fixed a series of metallic pins 4, whose ends project slightly beyond the surface of the front side of said head, said pins being electrically connected by the connecting-wires 5 with certain ones of the said connection-plates within the box A, as clearly illustrated in Fig. 2, or, in other words, with the alternate ones of said plates, and the connection-plate between each two plates that are so connected with the pins 4 are connected by the conducting-wire 6 with one pole of the battery $h$. The said wires 5, which are shown in Fig. 1 as composing a conductor-cable K of ordinary construction, are connected to the rear ends of said metallic pins 4, the diagram Fig. 2 showing in dotted lines on the head 3 the general course of said connections, said cable also comprising as one of its conductors the wire 6, leading from one pole of the battery to certain ones of the connection-plates $b$. As seen in the diagram Fig. 3, and which is substantially in accordance with what is shown in the preceding figures, every alternate pin $d'$, constituting a connection-piece, is connected with the battery-wire 6, the relatively intermediate pins being connected with their respective wires 5. Noting the position of the ball $e$ shown, it will be seen that the electrical connection is established between the wire 5, connecting with the particular pin 30, and the wire 6, connected to the particular pin 32. It will be plain that should the ball fall between the said particular pin 30 and the one 32 at the other side thereof the same electrical circuit would be established as under the conditions first named; and therefore, that there may be no double chances of establishing particular single circuits, deflecting-pins $g'$ or equivalent means are provided between alternate pairs of pins, substantially as shown in said diagram Fig. 3. These deflecting-pins, however, might be dispensed with in instances where the possibility of double chances for forming particular circuits are deemed immaterial. Said standard is made of wood or other non-conducting material. An electric signal-bell 7, of ordinary construction, is supported on said head 3, and has its electro-magnet connected with one pole of the battery by a conducting-wire 8, and from said magnet a conducting-wire 9 is taken and has one end thereof electrically connected with the central pin 10 in said head 3, said pin 10 being rigid in the head, and on the outer or front end of said pin 10 is closely fitted, but so that it may be turned by the fingers or rotated, a head 12, on the inner end of which is rigidly fixed an arm 13, preferably of elastic sheet metal, said head 12, as well as said arm, being of suitable metallic construction. Thus it will be seen that said arm 13 is in electrical connection with one pole of the battery $h$, through the line comprised by the conductors 8 and 9 and said signal-bell.

As shown in Fig. 1, figures are placed on the face of the head 3 near each of the said pins 4, denoting different numbers, for the purpose of indicating a manner of utilizing the within-described circuit-connector as a game for parlor amusement, as below described, and the operation of the within-described improvements is as follows:

The battery, as indicated either in Fig. 1 or 2, has one pole thereof, as described, connected with the central pin 10 of the head 3, and its opposite pole is connected with the alternate connection-plates $b$, as before described, and hence it will be seen that whenever the spherical connector $e$ is lodged between any two of the said connection-plates it forms an electric connection between the conductor 6 and some one of the conducting-wires 5 which is connected with one of the pins 4 in the head 3, and when the arm 13 is turned on the pin 10 and brought into contact one after another with the ends of said pins 4 the alarm-bell 7 will ring when said arm is brought against the pin, which is in electrical connection with the connection-plate $b$, through one of the wires 5, this effect being the result of the formation of a closed circuit between the poles of the battery; but that circuit may be broken by swinging the outer end of the arm 13 out of connection with the pin 4 or by tipping the box A, so that the spherical connector $e$ will roll off to another position; but wherever said connector may lie — that is, between whichsoever of said connecting-plates—it will aid in the formation of a closed circuit, as described, by the aid of the arm 13 and some one of the pins 4. Thus, as a means of parlor amusement, a number of persons may in turn guess the number, which may be rung by the alarm-bell, after tipping or oscillating the box A to cause the connector $e$ to take some position therein between the plates $b$, and the number so guessed will be indicated to be correct or not by turning the arm 13 until it shall by contact with one of the pins 4 indicate the number which is in the electrically-connected circuit; or several persons may guess different numbers, and in the same manner the highest number so guessed or estimated to be next brought into the electrical circuit may constitute the person naming it the winner.

From the above description of the above-described apparatus and its operation, and particularly of the means for forming electrical connections capable of producing signals, it is clearly seen that such connections are produced by a roving or traveling connector or switch consisting of the metallic sphere $e$, which is sent rolling around the bottom of the box A by tipping or oscillating the latter and which falls into some one of the recesses $d$ between said connection-plates, thereby forming what may be termed a "switch connection" between one pole of the battery and some one of the signal-pins 4, as above set forth.

The above description makes reference to only one of various uses to which the within-described devices may be applied wherein a traveling or roving circuit-connector may be utilized, and its further capabilities would obviously be comprehended by persons skilled in electrical constructions.

The signaling devices which are shown and described in this application, and which are connected with the roving or traveling electrical connecting devices, do not constitute the subject-matter of this application and the claims thereof, but constitute the subject-matter of another application which was filed simultaneously with this under date of July 19, 1889, Serial No. 318,076.

What I claim as my invention is—

1. Electrical circuit-connecting devices consisting of a group of metallic connection-pieces, substantially as described, and electric connections between said connection-pieces and the poles of a battery, substantially as set forth, and a roving switch connection consisting of a moving metallic body which may fall between any two of said connection-pieces, substantially as set forth.

2. Electrical circuit-connecting devices consisting of a group of metallic connection-pieces, substantially as described, and electric connections between said connection-pieces and the poles of a battery, substantially as set forth, and a roving switch connection consisting of a moving metallic body which may fall between any two of said connection-pieces, combined with a circular box, substantially as described, within which said connection-pieces are secured, having a convex surface on which said moving metallic body gravitates toward said plates, substantially as described.

3. Electrical circuit-connecting devices consisting of a group of metallic connection-pieces, substantially as described, and electric connections between said connection-pieces and the poles of a battery, substantially as set forth, and a roving switch connection consisting of a moving metallic body which may fall between any two of said connection-pieces, combined with a box, substantially as described, within which said connection-pieces are secured and wherein said metallic body may roll between and form an electric connection with any two of said connection-pieces, substantially as set forth.

WALDO L. GATES.

Witnesses:
H. A. CHAPIN,
G. M. CHAMBERLAIN.